United States Patent

Abusleme et al.

[11] Patent Number: 6,107,393
[45] Date of Patent: Aug. 22, 2000

[54] THERMOPROCESSABLE FLUORINATED POLYMERS

[75] Inventors: Julio Abusleme, Saronno; Claudia Manzoni, Bologna, both of Italy

[73] Assignee: Ausimont S.p.A., Milan, Italy

[21] Appl. No.: 09/044,032

[22] Filed: Mar. 19, 1998

[30] Foreign Application Priority Data

Mar. 21, 1997 [IT] Italy ................................ MI97A0654

[51] Int. Cl.⁷ .................................................. C08L 27/12
[52] U.S. Cl. .......................... 524/545; 525/150; 525/153; 525/170; 525/183; 525/199; 526/249; 526/254
[58] Field of Search .................................. 526/249, 254; 524/545; 525/150, 153, 170, 183, 199

[56] References Cited

U.S. PATENT DOCUMENTS

| | | |
|---|---|---|
| 2,599,640 | 6/1952 | Joyce et al. . |
| 3,445,434 | 5/1969 | Stilmar et al. . |
| 3,624,250 | 11/1971 | Carlson . |
| 4,513,129 | 4/1985 | Nakagawa et al. . |
| 4,789,717 | 12/1988 | Giannetti et al. . |
| 4,864,006 | 9/1989 | Giannetti et al. . |
| 4,906,770 | 3/1990 | Marchionni et al. . |
| 5,021,516 | 6/1991 | Wheland . |
| 5,182,342 | 1/1993 | Feiring et al. . |
| 5,434,229 | 7/1995 | Abusleme et al. . |
| 5,453,477 | 9/1995 | Oxenrider et al. . |
| 5,498,680 | 3/1996 | Abusleme et al. . |
| 5,510,435 | 4/1996 | Abusleme et al. . |
| 5,548,019 | 8/1996 | Kawakami et al. . |
| 5,569,728 | 10/1996 | Abusleme et al. . |

FOREIGN PATENT DOCUMENTS

| | | |
|---|---|---|
| 0043948A1 | 1/1982 | European Pat. Off. . |
| 0 185 241 | 6/1986 | European Pat. Off. . |
| 0 185 242 | 6/1986 | European Pat. Off. . |
| 0 186 215 | 7/1986 | European Pat. Off. . |
| 0391232A1 | 10/1990 | European Pat. Off. . |
| 0 526 216 | 2/1993 | European Pat. Off. . |
| 0 712 882 | 5/1996 | European Pat. Off. . |
| 0 728 776 | 8/1996 | European Pat. Off. . |

*Primary Examiner*—Bernard Lipman
*Attorney, Agent, or Firm*—Arent, Fox, Kintner, Plotkin & Kahn

[57] ABSTRACT

A copolymer comprising:

(a) from 10 to 70% by moles of ethylene, (b) from 30 to 90% by moles of a fluorinated monomer selected from tetrafluoroethylene, chlorotrifluoroethylene, or their mixtures, (c) from 0.1 to 30% by moles, with respect to the total amount of monomers (a) and (b), of a hydrogenated monomer having the formula:

$$CH_2=CH-(CH_2)_n-R_1 \qquad (I)$$

where $R_1 = -OR_2$, $-(O)_t CO(O)_p R_2$ with t and p as integers: t=0 or 1 and p=0 or 1 and $R_2$ is a hydrogenated radical from 1 to 20 carbon atoms $C_1-C_{20}$, branched and/or linear alkyl and cyclo-alkyl radical or $R_2$ is H. The $R_2$ radical may optionally contain: heteroatoms preferably Cl, O, N; one or more functional groups, preferably chosen among OH, COOH, epoxide, ester and ether; and double bonds. The n subscript is an integer number between 0 and 10.

14 Claims, No Drawings

THERMOPROCESSABLE FLUORINATED POLYMERS

The present invention relates to thermoprocessable fluorinated polymers having improved affinity with hydrogenated compounds.

More particularly the present invention relates to modified ethylene copolymers with tetrafluoroethylene (ETFE) and/or chlorotrifluoroethylene (ECTFE), to be used for applications in flexible cables having the properties indicated below.

The copolymers between ethylene and a fluorinated monomer such as tetrafluoroethylene (TFE), chlorotrifluoroethylene (CTFE), or both, are known in the art. It is also known the possibility of modifying them with fluorinated olefins and/or fluoroalkylvinylethers in amounts comprised between 0.1 and 10% by moles. (Per)fluoroalkylvinylethers are for instance mentioned wherein alkyl has at least two carbon atoms, in particular the perfluoropropylvinylether (see U.S. Pat. No. 3,624,250). Other possible comonomers, alternative to the previous ones, having for instance formula R—CH=CH$_2$, wherein R is a perfluoroalkyl or a perfluoroalkoxy-perfluoroalkyl, are described in EP 185,241 and in EP 185,242.

The above-mentioned ETFE and ECTFE copolymers non modified with fluoroolefins have in general scarce affinity with hydrogenated substances, being them polymers or high molecular weight compounds (for example plasticizers).

In the patent EP-728.776 a fluoroolefin capable of copolymerizing with fluorinated olefins is disclosed, leading for example to a modified ETFE. This polymer shows good affinity with hydrogenated polymers, in particular aromatic polyesters.

In general the synthesis of modifier fluoroolefins are complexes and therefore they are used as comonomers in ethylene fluoropolymers when high performance is required. For example good chemical resistance combined with excellent mechanical properties at high temperatures (150–200° C.).

A particular industrial interest is the preparation of fluoropolymers blended with one or more plasticizers to make them flexible and usable in the cable industry. These polymers must be characterized by the absence of the whitening phenomena when the cable is bended.

The whitening effect must be avoided as it visually represents the plastic deformation of the material wherefore this cannot recover the initial state any longer. For instance in the plenum wire insulation and jacketing fields, electric properties are required which are widely met by ECTFE which however has a high elastic modulus at room temperature, generally higher than 1500 MPa, hence not flexible. Moreover it shows a stress-strain curve characterized by a necking at yield which makes it sensitive to the whitening effect on the bended cable. The ECTFE elastic modulus can be lowered with the addition of plasticizers, but the obtained product still shows the whitening effect.

It was felt the need to have available fluorinated polymers in particular of the ETFE or ECTFE type not showing the whitening phenomenon. Obviously this property must be combined with good mechanical properties typical of the mentioned fluorinated polymers.

The Applicant has surprisingly and unexpectedly found ethylene fluorinated copolymers allowing to avoid the whitening phenomenon, having good mechanical properties and showing an improved affinity with hydrogenated chemical substances with respect to the ethylene fluorinated copolymers only formed by TFE and/or CTFE.

It is therefore an object of the present invention a copolymer comprising:

(a) from 10 to 70%, preferably from 35 to 55%, by moles of ethylene, (b) from 30 to 90%, preferably from 45 to 65%, by moles of a fluorinated monomer selected from tetrafluoroethylene, chlorotrifluoroethylene, or their mixtures, (c) from 0.1 to 30%, prefrably from 1 to 15% by moles, with respect to the total amount of monomers (a) and (b), of a hydrogenated monomer having the formula:

$$CH_2=CH-(CH_2)_n-R_1 \qquad (I)$$

where $R_1$=—$OR_2$, —$(O)_tCO\ (O)_pR_2$ with t and p as integers: t=0 or 1 and p=0 or 1 and $R_2$ is a hydrogenated radical from 1 to 20 carbon atoms $C_1$–$C_{20}$, branched and/or linear alkyl and cyclo-alkyl radical or $R_2$ is H. The $R_2$ radical may optionally contain: heteroatoms preferably Cl, O, N; one or more functional groups, preferably chosen among OH, COOH, epoxide, ester and ether; and double bonds. The n subscript is an integer number between 0 and 10.

Preferably $R_2$ is an alkyl radical from 1 to 10 carbon atoms optionally containing one or more hydroxy functional groups and n is an integer from 0 to 5.

The preferred comonomers (c) are for example chosen among the following classes:

1) Acrylic monomers of formula:

$$CH_2=CH-CO-O-R_2$$
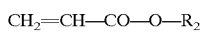

wherein $R_2$ has the aforesaid meaning.

For example: ethylacrylate, n-butylacrylate, acrylic acid, hydroxyethylacrylate, hydroxypropylacrylate, (hydroxy)ethylhexylacrylate, ecc.

2) vinylether monomers of formula:

$$CH_2=CH-O-R_2$$

wherein $R_2$ has the aforesaid meaning.

For example: propylvinylether, cyclohexylvinylether, vinyl-4-hydroxybutylether, ecc.

3) Vinyl monomers of the carboxylic acid of formula:

$$CH_2=CH-O-CO-R_2$$
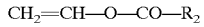

wherein $R_2$ has the aforesaid meaning.

For example: vinyl-acetate, vinylpropionate, vinyl-2-ethylhexanoate, ecc.

4) Unsaturated carboxylic acid of formula:

$$CH_2=CH-(CH_2)_n-COOH$$
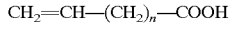

wherein n has the aforesaid meaning. For example vinylacetic acid, ecc.

The most preferred monomer of formula (I) is the n-butyl acrylate.

Compositions obtained by adding to the copolymer of the invention one or more hydrogenated plasticizers, well known in the art of the plasticizers for hydrogenated polymers, in amounts from 1 to 20% by weight, preferably from 5 to 10% to the copolymers of the invention, do not show any whitening phenomenon.

The compositions that use the copolymers of the present invention make possible to obtain new more flexible ECTFE or ETFE having a low elastic modulus. Furthermore the compositions show no necking at yield on the stress-strain curve at room temperature.

As plasticizers we can cite for example 2-ethylhexyldiphenylphosphate, neopentylglycoldibenzoate, tricresylphosphate, tetrabromophtalic ester, tri n-butyl-trimellitate, tri n-hexyl-trimellitate, monostearate of ethylene glycol, acetyltri-n-butyl citrate, acetyltri-n-hexyl citrate. Some of these plasticizers are known on the market with the following names: Phosflex$^R$362, Morflex$^R$560, Citroflex$^R$.

The process for preparing the copolymers of the present invention is carried out according to known techniques, by copolymerization of the corresponding monomers, in suspension in organic medium or in aqueous emulsion, in the present of a suitable radical initiator, at a temperature comprised between −60° and 150° C., preferably between −20° and 100° C., more preferably between −10° and 50° C. The reaction pressure is comprised between 0.5 and 100 bar, preferably between 5 and 40 bar.

The addition of the hydrogenated comonomer (c) is carried out according to known techniques of the art, however a continuous or step by step addition of the monomer of formula (I) during the reaction is preferred.

Among the various radical initiators, it can be used in particular:

(i) bis-acylperoxides of formula $(R_f\text{—CO—O})_2$, wherein $R_f$ is a (per)haloalkyl $C_1$–$C_{10}$ (see for intance EP 185,242 and U.S. Pat. No. 4,513,129), or a perfluoropolyoxyalkylene group (see for instance EP 186,215 and U.S. Pat. No. 5,021,516); among them, bis-trichloroacetylperoxide and bis-dichlorofluoro acetylperoxide are particularly preferred (see U.S. Pat. No. 5,569,728);

(ii) dialkylperoxides of formula $(R_H\text{—O})_2$, wherein $R_H$ is an alkyl $C_1$–$C_{10}$; diterbutylperoxide (DTBP) is particularly preferred;

(iii) water soluble inorganic peroxides, such as ammonium or alkaline metals persulphates or perphosphates; sodium and potassium persulphate is particularly preferred;

(iv) dialkylperoxydicarbonates, wherein the alkyl has from 1 to 8 carbon atoms, such as di-n-propyl-peroxydicarbonate and di-isopropyl-peroxydicarbonate (see EP 526,216);

(v) organic or inorganic redox systems, such as ammonium persulphate/sodium sulphite, hydrogen peroxide/aminoiminomethansulphinic acid, terbutylhydroperoxide/metabisulphite (see U.S. Pat. No. 5,453,477).

In the case of the suspension copolymerization, the reaction medium is formed by an organic phase, to which water is usually added in order to favour the heat dispersion developing during the reaction. The organic phase can be formed by the monomers themselves, without addition of solvents, or by the monomers dissolved in a suitable organic solvent. As organic solvents chlorofluorocarbons are commonly used, such as $CCl_2F_2$ (CFC-12), $CCl_3F$ (CFC-11), $CCl_2FCClF_2$, (CFC-113), $CClF_2CClF_2$ (CFC-114), etc. Since such products have a destroying effect on the ozone present in the stratosphere, alternative products have been recently proposed, such as the compounds containing only carbon, fluorine, hydrogen and optionally oxygen, described in U.S. Pat. No. 5,182,342. In particular (per)fluoropolyethers with at least one hydrogenated end group, preferably two, such as —$CF_2H$, —$CF_2CF_2H$, —$CF(CF_3)H$, can be used. A valid alternative is qiven by the hydrocarbons with branched chain described in U.S. Pat. No. 5,434,229, having from 6 to 25 carbon atoms and a ratio between methyl groups and carbon atom number higher than 0.5, such as for instance 2,3-dimethylbutane, 2,3-dimethylpentane, 2,2,4-trimethylpentane, 2,2,-4,6,6-pentamethylheptane, 2,2,4,4,6-pentamethylheptane, etc, or mixtures thereof.

In the case of aqueous emulsion (co)polymerization, the presence of a suitable surfactant is required. The fluorinated surfactants of formula:

$R_f X^- M^+$ are the most commonly used, wherein $R_f$ is a (per)fluoroalkyl chain $C_5$–$C_{16}$ or a (per)fluoropolyoxyalkylene chain, $X^-$ is —$COO^-$ or —$SO_3^-$, $M^+$ is selected from: $H^+$, $NH_4^+$, an alkaline metal ion. Among them we can cite: ammonium and/or sodium perfluorooctanoate, (per)fluoropolyoxyalkylenes having one or more carboxylic end groups, etc.

The process object of the present invention can be advantageously carried out in the presence of dispersions, emulsions or microemulsions of perfluoropolyoxyalkylenes, according to U.S. Pat. No. 4,789,717 and U.S. Pat. No. 4,864,006, or also of microemulsions of fluoropolyoxyalkylenes having hydrogenated end groups and/or hydrogenated repeating units, optionally in mixture with a hydrocarbon, according to U.S. Pat. No. 5,498,680 and EPA 712,882.

The control of molecular weight of fluoropolymers generally strongly needs the use of telogen agents (chain transfer agents) in polymerization, owing to the fact that the used monomers generally do not show a telogen activity comparable to that of the known chain transfer agents.

The hydrogenated monomers (c) may have a telogen activity comparable to that of a conventional chain transfer agent especially at high temperatures, i.e., between 20° and 100° C. In this case the control of the molecular weight can be made in absence of chain transfer agents.

When chain transfer agents are used, these can be for example hydrocarbons or halogenated hydrocarbons, having from 1 to 6 carbon atoms. Among them, chloroform and substituted alkyl cyclopentanes are particularly preferred (see U.S. Pat. No. 5,510,435), in particular methylcyclopentane. The transfer agent is introduced into the reactor at the beginning of the reaction, or continuously or step by step during the polymerization. The amount of chain transfer agent can range within rather wide limits, depending on the polymerization conditions (reaction temperature, monomers, molecular weight required of the polymer, etc). In general such amount ranges from 0.01 to 30% by weight, preferably from 0.05 to 10% by weight, based on the total amount of monomers introduced in the reactor.

A remarkable advantage of the comonomers (c) of the present invention is given by the fact that their high reactivity in the polymerization system of the invention does not require, after reaction, the recovery of the unreacted monomers.

The copolymers of the invention show a good affinity with hydrogenated compounds, such as for instance the plasticizers cited above or hydrogenated polymers in general. The blends between fluorinated polymers of this invention and hydrogenated polymers show good mechanical properties with an elongation at break of about 100% at room temperature. The coagents, pigments, etc.

Another possible application of the copolymers of the invention is in the powder coating field, which can be the primer or the top-coat, or complementary part thereof.

Some examples of the present invention are reported hereinafter, whose purpose is merely illustrative but not limitative of the scope of the invention itself.

EXAMPLE 1

In an enamelled autoclave equipped with baffles and stirrer working at 450 rpm, 5.3 l of demineralized water, 1,7 l of methanol, 20 ml of methylcyclopentane, 10 g of n-butylacrylate and 2 kg of chlorotrifluoroethylene were introduced. Then the temperature was brought to 15° C. and ethylene was fed up to a pressure of 10 absolute bar. In the autoclave the radical initiator was then continuously fed during the polymerization under the form of a solution, maintained at −17° C., of trichloroacetylperoxide (TCAP) in isooctane having a titre of 0.15 gTCAP/ml. Furthermore 10 g of n-butylacrylate were fed at consumption of 20, 40, 60, 80, 100, 120, 140, 160 and 180 g of ethylene.

The pressure was maintained constant during the polymerization by continuously feeding ethylene to the reactor up to a consumption of 200 g; in total 177 ml of initiator solution were introduced. The polymerization lasted 465 characteristics and the applications of these polymer blends depend mainly on the nature of the polymers and on the composition of the blend. This is a further property of the copolymers of the invention respect to ethylene fluorinated copolymers, which do not form homogeneous blends with hydrogenated polymers due to their scarse affinity.

The above blends and the copolymers of the present invention can be processed as done in the art of processing of plastic materials.

The blends can be formed by one or more copolymers of the present invention and one or more hydrogenated polymers known in the art. As an example we can cite: polyamides, aromatic polyesters, polycarbonates, polyacrylates, polysulphones, polyetherimides, polyphenylethers, acrylic polymers, polyethylene, polypropylene, polyether sulphone, polyether ketone, polyether-ether-ketone, poly-phenylene sulfide, etc. The above blends can be used for up-grading the hydrogenated polymer.

A further application of the copolymer of the invention can be the preparation of dispersions or solutions of the functionalized polymers of the present invention in organic solvents. These dispersion or solutions are in general formulated with typical substances known in the art of coatings, for instance crosslinking agents, crosslinking minutes.

The product discharged from the autoclave was dried at 120° C. for about 16 hours. The amount of dry polymer obtained was 1530 g.

The following properties of the obtained product, defined "Polymer A", are reported in Table 1; Melt Flow Index (M.I.) according to the ASTM 3275-89 at temperature and weight specified in the Table, second melting temperature ($T_{mII}$) determined by differential scanning calorimetry (DSC) and molar composition obtained by carbon elemental analysis and by material balance of the hydrogenated comonomer added in reaction. In Table 2a the mechanical properties at 23° C., on compression molded plaques, according to the ASTM D1708, are reported.

EXAMPLE 2

Example 1 was repeated except that the polymerization pressure was 8.2 absolute bar and the total amount of initiator solution introduced was equal to 399 ml with a titre of 0.10 gTCAP/ml. The polymerization lasted 555 minutes.

The product discharged from the autoclave was dried at 120° C. for about 16 hours. The amount of dry polymer obtained was 1205 g.

The $T_{mII}$, the M.I. and the molar composition of the polymer, defined "Polymer B", are reported in Table 1. In Table 2a the mechanical properties at 23° C. are reported.

EXAMPLE 3

Example 2 was repeated except that a total of 200 g of n-butylacrylate (10 g initially introduced and then 10 g every 10 g of ethylene consumption) and 446 ml of initiator solution were fed to the reactor during the polymerization. The polymerization lasted 735 minutes.

The product discharged from the autoclave was dried at 120° C. for about 16 hours. The amount of dry polymer obtained was 1070 g.

The $T_{mII}$, the M.I. and the molar composition of the polymer, defined "Polymer C", are reported in Table 1. In Table 2b the mechanical properties at 23° C. are reported.

EXAMPLE 4 (comparative)

In an enamelled autoclave equipped with baffles and stirrer working at 450 rpm, 5.3 l of demineralized water, 1,7 l of methanol, 52 ml of methylcyclopentane and 2 kg of chlorotrifluoroethylene were introduced. Then the temperature was brought to 15° C. and ethylene was fed up to a pressure of 12.6 absolute bar. In the autoclave the radical initiator was then introduced under the form of a solution, maintained at −17° C., of trichloroacetylperoxide (TCAP) in isooctane having a titre of 0.12 gTCAP/ml, with a flow-rate of 40 ml/hour during the polymerization.

The pressure was maintained constant during the polymerization by continuously feeding ethylene to the reactor up to a consumption of 200 g; in total 200 ml of initiator solution were introduced.

The product discharged from the autoclave was dried at 120° C. for about 16 hours. The amount of dry polymer obtained was 1507 g.

The $T_{mII}$, the M.I. and the molar composition of the polymer, defined "Polymer D", are reported in Table 1. In Table 2b are reported the mechanical properties at 23° C.

EXAMPLE 5

The polymers A,B,C and D in powder were compounded with the plasticizer Morflex 560 (tri n-hexyl-trimellitate) in amounts specified in Tables 2a and 2b. Then these compounded products were extruded in a single-screw Brabender extruder made in Hastelloy C of 18 mm diameter with a length equivalent to 25 times the diameter.

The mechanical properties at 23° C. of the raw and the plasticized polymers are reported in Tables 2a and 2b. Morflex 560 is the plasticizer A.

The plasticized polymers have an elastic modulus and yield stress lower than the original polymers. This is much more evident as the percentage of the plasticizer increases. The absence of necking at yield is only observed in the stress-strain curve of the plasticized polymers modified with n-butylacrylate.

EXAMPLE 6

Blends of the polymers A and D with a virgin acrylic rubber of composition 50/50 by moles of ethylacrylate/butylacrylate were prepared. The acrylic rubber is defined as "Polymer E".

The acrylic rubber was introduced in a mixer together with solid $CO_2$ to bring the system temperature under the glass transition temperature of the rubber, thus being able to crumble it and homogeneously mixing it with the polymer A or D. The blends prepared were then pelletized in the same single-screw extruder of the previous Example.

In Table 3 compositions by weight of the blends and the respective mechanical properties at 23° C. are reported.

The good mixing or affinity between the polymers A and E can be observed in Table 3, where the elongation at break for both blends is higher than 100%. Conversely, the polymer D does not form a valid blend with E even though the rubber content of the blend is only 10% by weight.

EXAMPLE 7

Example 2 was repeated but by using vinylacetate instead of n-butylacrylate and by charging to the reactor instead of the amounts of Example 2: 6.5 l of demineralized water, 0.5 l of methanol, 15 ml of methylcyclopentane, 70 g of vinylacetate (7 g initially introduced and then 7 g every 20 g of ethylene consumption) and 256 ml of initiator solution of titre of 0.13 gTCAP/ml. The polymerization lasted 550 minutes.

The product discharged from the autoclave was dried at 120° C. for about 16 hours. The amount of dry polymer obtained was 1460 g.

The $T_{mII}$, the M.I. and the molar composition of the polymer, defined "Polymer F", are reported in Table 1.

EXAMPLE 8

Example 7 was repeated but by using propylvinylether instead of vinylacetate in absence of methanol and by charging to the reactor 7 l of demineralized water and 306 ml of initiator solution with titre of 0.12 gTCAP/ml. The polymerization lasted 675 minutes.

The product discharged from the autoclave was dried at 120° C. for about 16 hours. The amount of dry polymer obtained was 1140 g.

The $T_{mII}$, the M.I. and the molar composition of the polymer, defined "Polymer G", are reported in Table 1.

EXAMPLE 9

Example 8 was repeated but by using vinyl-4-hydroxybutylether instead of propylvinylether, feeding 90 g of vinyl-4-hydroxy-butylether (9 g initially introduced and then 9 g every 20 g of ethylene consumption) and 252 ml of initiator solution with titre of 0.12 gTCAP/ml. The polymerization lasted 510 minutes.

The product discharged from the autoclave was dried at 120° C. for about 16 hours. The amount of dry polymer obtained was 1210 g.

The $T_{mII}$, the M.I. and the molar composition of the polymer, defined "Polymer H", are reported in Table 1.

TABLE 1

| Examples | $T_{mII}$ (° C.) | M.I. 260° C., 2.16 Kg (g/10') | Ethylene (% by moles) | CTFE (% by moles) | Hydrogenated monomer (% by moles) |
|---|---|---|---|---|---|
| Polymer A (Example 1) | 211.1 | 4 | 46 | 50 | n-butyl acrylate 4 |
| Polymer B (Example 2) | 193.1 | 23.4 | 40 | 55 | n-butyl acrylate 5 |
| Polymer C (Example 3) | 190.1 | 43.8 | 36 | 55 | n-butyl acrylate 9 |
| Polymer D (Example 4 comp.) | 236.8 | 11.1 | 49 | 51 | — |
| Polymer F (Example 7) | 152.5 | 2.5[1] | 40 | 55 | vinyl acetate 5 |
| Polymer G (Example 8) | 200.6 | 30.1[1] | 40 | 55 | propyl vinyl ether 5 |
| Polymer H (Example 9) | 190 | 9.2[1] | 40 | 55 | vinyl 4 hydroxy butyl ether 5 |

[1]measured at 225° C.

TABLE 2a

Mechanical properties at 23° C. on compression molded plaques according to the ASTM D1708

| Mechanical properties | Pol. A | Pol. A 92% by weight Plas. A 8% by weight | Pol. A 85% by weight Plas. A 15% by weight | Pol. B | Pol. B 92% by weight Plas. A 8% by weight | Pol. B 85% by weight Plas. A 15% by weight |
|---|---|---|---|---|---|---|
| Elastic modulus (MPa) | 1210 | 440 | 310 | 1190 | 400 | 283 |
| Yield stress (MPa) | 28.2 | 13.7 | 11.9 | 27.1 | 12.1 | 8.9 |

TABLE 2a-continued

Mechanical properties at 23° C. on compression molded plaques according to the ASTM D1708

| Mechanical properties | Pol. A | Pol. A 92% by weight Plas. A 8% by weight | Pol. A 85% by weight Plas. A 15% by weight | Pol. B | Pol. B 92% by weight Plas. A 8% by weight | Pol. B 85% by weight Plas. A 15% by weight |
|---|---|---|---|---|---|---|
| Yield strain (%) | 4.5 | (*) | (*) | 4.8 | (*) | (*) |
| Stress at break (MPa) | 41 | 32 | 31.4 | 34 | 30.7 | 25.5 |
| Elongation at break (%) | 250 | 260 | 310 | 234 | 327 | 313 |

(*) The stress-strain curve is absent of a necking at yield making it difficult to define the yield strain.

TABLE 2b

Mechanical properties at 23° C. on compression molded plaques according to the ASTM D1708

| Mechanical properties | Pol. C | Pol. C 92% by weight Plas. A 8% by weight | Pol. D (comp.) | Pol. D 92% by weight Plas. A 8% by weight | Pol. D 85% by weight Plas. A 15% by weight |
|---|---|---|---|---|---|
| Elastic modulus (MPa) | 828 | 224 | 1600 | 638 | 450 |
| Yield stress (MPa) | 18 | 6.9 | 33 | 16 | 14 |
| Yield strain (%) | 4.2 | (*) | 4.5 | 6.6 | 6.6 |
| Stress at break (MPa) | 32.4 | 23.1 | 49 | 31.1 | 29.4 |
| Elongation at break (%) | 271 | 312 | 264 | 220 | 310 |

(*) The stress-strain curve is absent of a necking at yield making it difficult to define the yield strain.

TABLE 3

Mechanical properties at 23° C. on compression molded plaques according to the ASTM D1708

| Mechanical properties | Polymer A 90% by weight Polymer E 10% by weight | Polymer A 80% by weight Polymer E 20% by weight | Polymer D 90% by weight 10% by weight (comp.) |
|---|---|---|---|
| Elastic modulus (MPa) | 760 | 600 | 880 |
| Yield stress (MPa) | 17.5 | 13.5 | 19 |
| Stress at break (MPa) | 23 | 18 | 18 |
| Elongation at break (%) | 160 | 120 | 25 |

What is claimed is:

1. A thermoprocessable fluorinated copolymer consisting essentially of:
   (a) from 10 to 70%, by moles, of ethylene,
   (b) from 30 to 90%, by moles, of a fluorinated monomer selected from the group consisting of tetrafluoroethylene, chlorotrifluoroethylene, and mixtures thereof, and
   (c) from 0.1 to 30%, by moles, based on the total amount of monomers (a) and (b), of a hydrogenated monomer having the formula:

$$CH_2=CH-(CH_2)_n-R_1 \qquad (I)$$

where $R_1=-OR_2$, $-(O)_tCO(O)_pR_2$ with t and p as integers: t=0 or 1 and p=0 or 1 excluding p=0 when t=0 and $R_2$ is a hydrogenated radical from 1 to 20, carbon atoms $C_1-C_{20}$ branched and/or linear alkyl and cycloalkyl radical or $R_2$ is H and n is an integer between 0 and 10 with the proviso that when n=1, $R_1=-(O)_tCO(O)_pR_2$.

2. The copolymer according to claim 1, wherein the comonomers (c) are reselected from the following classes:
   1) acrylic monomers having the general formula:

$$CH_2=CH-CO-O-R_2$$

wherein $R_2$ has the meaning indicated above,
   2) vinylether monomers having the formula:

$$CH_2=CH-O-R_2$$

wherein $R_2$ has the meaning indicated above,
   3) vinyl monomers of the carboxylic acid having the formula:

$$CH_2=CH-O-CO-R_2$$

wherein $R_2$ has the meaning indicated above,
   4) unsaturated carboxylic acids having the formula $$CH_2=CH-(CH_2)_n-COOH$$

wherein n has the meaning indicated above.

3. The copolymer according to claim 1, wherein $R_2$ is of alkylic substituent from 1 to 10 carbon atoms containing functional hydroxide groups of, and n is an integer comprised between 0 and 5.

4. The copolymer according to claim 1 wherein the comonomers (c) are selected from the group consisting of:
ethylacrylate, n-butylacrylate, acrylic acid, hydroxyethylacrylate, hydroxypropylacrylate, (hydroxy) ethylhexylacrylate; propylvinylether, cyclohexylvinylether, vinyl-4-hydroxybutyl ether; vinyl-acetate, vinylpropionate, vinyl-2-ethylhexanoate; vinylacetic acid.

5. Compositions comprising the copolymer according to claim 1 and one or more hydrogenated plasticizer selected from the plasticizers of the hydrogenated polymers, in amounts from 1 to 20% by weight, with respect to the total weight.

6. Compositions according to claim 5 wherein the plasticizers are selected from the group consisting of: 2-ethylhexyldiphenyl-phosphate, neopentylglycoldibenzoate, tricresylphosphate, tetrabromophtalic ester, tri n-butyltrimellitate, tri n-hexyl-trimellitate, ethylene glycol monostearate, acetyltri-n-butyl citrate, acetiltri-n-hexyl citrate.

7. A process for preparing copolymers according to claim 1 wherein the copolymerization of the monomers is carried out in suspension in organic medium or in aqueous emulsion, in the presence of radical initiators, at a temperature comprised between 600 and 150° C.

8. The process for preparing copolymers according to claim 7 wherein the radical initiators are selected from the group consisting of:
(i) bis-acylperoxides of formula $(R_f\text{---}CO\text{---}O)_2$ wherein $R_f$ is a (per)haloalkyl $C_1\text{--}C_{10}$ or a perfluoropolyoxy-alkylene group;
(ii) dialkylperoxides of formula $(R_H\text{---}O)_2$ wherein $R_H$ is an alkyl $C_1\text{--}C_{10}$;
(iii) water soluble inorganic peroxides;
(iv) dialkylperoxydicarbonates, wherein the alkyl has from 1 to 8 carbon atoms;
(v) organic or inorganic redox systems.

9. The process for preparing copolymers according to claim 1 wherein the (co)polymerization is carried out in aqueous emulsion in the presence of a surfactant of formula: $R_fX^-M^+$ wherein $R_f$ is a (per)fluoroalkyl $C_5\text{--}C_{16}$ chain or (per)fluoropolyoxyalkylene chain, x is ---COO or ---SO$_3$---, $M^+$ is selected from the group consisting of: $H^+$, $NH_4^+$ and an alkaline metal ion.

10. Process for preparing copolymers according to claim 9 wherein the polymerization is carried out in the presence of dispersions, emulsions or microemulsions of perfluoropolyoxyalkylenes, or of microemulsions of fluoropolyoxyalkylenes having hydrogenated end groups and/or hydrogenated repeating units, optionally in mixture with an hydrocarbon.

11. Blends of the copolymers according to claim 1 with hydrogenated polymers.

12. Blends according to claim 11, wherein the hydrogenated polymers are selected from the group consisting of polyamides, aromatic polyesters, polycarbonates, polyacrylates, polysulphones, polyetherimides, polyphenylethers, acrylic polymers, polyethylene, polypropylene, polyether sulfone, polyether ketone, polyether-ether-ketone, and polyphenylene sulfide.

13. In a method for preparing flexible cables the improvement comprising manufacturing said cables from with a copolymer comprising:
(a) from 10 to 70%, by moles, of ethylene,
(b) from 30 to 90%, by moles, of a fluorinated monomer selected from the group consisting of tetrafluoroethylene, chlorotrifluoroethylene, and mixtures thereof, and
(c) from 0.1 to 30%, by moles, based on the total amount of monomers (a) and (b), of a hydrogenated monomer having the formula:

$$CH_2=CH\text{---}(CH_2)_n\text{---}R_1 \qquad (I)$$

where $R_1$=---$OR_2$, ---$(O)_tCO(O)_pR_2$ with t and p as integers: t=0 or 1 and p=0 or 1 and $R_2$ is a hydrogenated radical from 1 to 20 carbon atoms, $C_1\text{--}C_{20}$ branched and/or linear alkyl and cyclo-alkyl radical or $R_2$ is H and n is an integer number between 0 and 10 and one or more hydrogenated plasticizers selected from the plasticizers of the hydrogenated polymers, in amounts from 1 to 20% by weight, with respect to the total weight.

14. The method according to claim 13 wherein the plasticizers are selected from the group consisting of: 2-ethylhexyldiphenyl-phosphate, neopentylglycoldibenzoate, tricresylphosphate, tetrabromophtalic ester, tri n-butyltrimellitate, tri n-hexyl-trimellitate, ethylene glycol monostearate, acetyltri-n-butyl citrate, acetiltri-n-hexyl citrate.

* * * * *